United States Patent
Lee et al.

(10) Patent No.: US 11,732,126 B2
(45) Date of Patent: Aug. 22, 2023

(54) THERMOPLASTIC RESIN COMPOSITION AND MOLDED PRODUCT PRODUCED THEREFROM

(71) Applicant: LOTTE CHEMICAL CORPORATION, Seoul (KR)

(72) Inventors: Min Soo Lee, Uiwang-si (KR); Eric Arifin, Uiwang-si (KR); Seon Hui Lee, Uiwang-si (KR); Bong Jae Lee, Uiwang-si (KR); Sang Hyun Hong, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 219 days.

(21) Appl. No.: 17/276,215

(22) PCT Filed: Sep. 24, 2019

(86) PCT No.: PCT/KR2019/012388
§ 371 (c)(1),
(2) Date: Mar. 15, 2021

(87) PCT Pub. No.: WO2020/067695
PCT Pub. Date: Apr. 2, 2020

(65) Prior Publication Data
US 2022/0033643 A1    Feb. 3, 2022

(30) Foreign Application Priority Data
Sep. 28, 2018 (KR) .................. 10-2018-0115673

(51) Int. Cl.
*C08L 67/02* (2006.01)

(52) U.S. Cl.
CPC ......... *C08L 67/02* (2013.01); *C08L 2205/025* (2013.01); *C08L 2205/035* (2013.01)

(58) Field of Classification Search
CPC .............. C08L 67/02; C08L 2205/025; C08L 2205/035; C08L 67/025; C08L 69/00; C08J 5/04; C08J 5/043; C08K 7/14; C08K 2201/003
See application file for complete search history.

(56) References Cited

U.S. PATENT DOCUMENTS

| | | |
|---|---|---|
| 2007/0066743 A1 | 3/2007 | Rogunova et al. |
| 2007/0173617 A1 | 7/2007 | Eipper et al. |
| 2008/0103217 A1 | 5/2008 | Sunkara |
| 2009/0209696 A1* | 8/2009 | Lee .................. C08L 67/02 524/494 |
| 2011/0071240 A1 | 3/2011 | Ding et al. |
| 2011/0319534 A1 | 12/2011 | Ding et al. |
| 2011/0319536 A1 | 12/2011 | Ding et al. |
| 2012/0004363 A1 | 1/2012 | Urushihara et al. |
| 2012/0108729 A1 | 5/2012 | Lyons et al. |
| 2014/0256848 A1 | 9/2014 | Lyons et al. |
| 2017/0066920 A1 | 3/2017 | Greger |

FOREIGN PATENT DOCUMENTS

| | | |
|---|---|---|
| CN | 101402784 A | 4/2009 |
| CN | 101535371 A | 9/2009 |
| JP | 2001-234046 A | 8/2001 |
| JP | 2008120925 A * | 5/2008 |
| JP | 2012-533645 A | 12/2012 |
| KR | 10-2007-0001990 A | 1/2007 |
| KR | 10-2011-0131281 A | 12/2011 |
| KR | 10-2012-0085250 A | 7/2012 |
| KR | 10-2013-0100923 A | 9/2013 |
| KR | 10-2013-0141349 A | 12/2013 |
| WO | 2020/067695 A1 | 4/2020 |

OTHER PUBLICATIONS

International Search Report in counterpart International Application No. PCT/KR2019/012388 dated Jan. 2, 2020, pp. 1-8.
Office Action in counterpart Chinese Application No. 201980063188.5 dated May 18, 2022, pp. 1-7.

* cited by examiner

*Primary Examiner* — Marc S Zimmer
*Assistant Examiner* — Surbhi M Du
(74) *Attorney, Agent, or Firm* — Additon, Pendleton & Witherspoon, P.A.

(57) ABSTRACT

A thermoplastic resin composition of the present invention comprises: about 100 parts by weight of a thermoplastic resin including a polyester resin; about 50-150 parts by weight of glass fibers; and about 1-10 parts by weight of a polyether-ester copolymer, wherein the polyether-ester copolymer has a melt volume flow rate (MVR) of about 30-120 cm$^3$/10 min as measured under conditions of 230° C. and 2.16 kg based on ISO 1133. The thermoplastic resin composition is excellent in impact resistance, appearance characteristics, metal joining properties, and the like.

10 Claims, No Drawings

THERMOPLASTIC RESIN COMPOSITION AND MOLDED PRODUCT PRODUCED THEREFROM

CROSS-REFERENCE TO RELATED APPLICATIONS

This application claims priority to and the benefit of International Application No. PCT/KR2019/012388, filed Sep. 24, 2019, which published as WO 2020/067695 on Apr. 2, 2020, and Korean Patent Application No. 10-2018-0115673, filed in the Korean Intellectual Property Office on Sep. 28, 2018, the entire disclosure of each of which is incorporated herein by reference.

TECHNICAL FIELD

The present invention relates to a thermoplastic resin composition and a molded product produced therefrom. More particularly, the present invention relates to a thermoplastic resin composition having good properties in terms of impact resistance, appearance characteristics, and the like, and a molded product produced therefrom.

BACKGROUND ART

As engineering plastics, a polyester resin and a blend of a polyester resin and a polycarbonate resin exhibit useful properties and are applied to various fields including interior and exterior materials for electric/electronic products. However, the polyester resin has problems of a low crystallization rate, low mechanical strength, and low impact strength.

Thus, various attempts have been made to improve mechanical strength and impact strength of the polyester resin by adding additives such as inorganic fillers to the polyester resin. For example, polybutylene terephthalate (PBT) resins reinforced by inorganic fillers, such as glass fibers and the like, are frequently used as materials for housings of automobile components or mobile phones. Since such materials have a limitation in improvement of impact resistance, an impact modifier may be further added thereto to improve impact resistance. However, a typical impact modifier has a problem of deterioration in appearance characteristics due to elution thereof on a product surface upon processing at high temperature.

Therefore, there is a need for development of a thermoplastic resin composition having good impact resistance, appearance characteristics, and balance therebetween.

The background technique of the present invention is disclosed in Japanese Patent Publication No. 2012-533645 and the like.

DISCLOSURE

Technical Problem

It is one aspect of the present invention to provide a thermoplastic resin composition having good properties in terms of impact resistance, appearance characteristics, and the like.

It is another aspect of the present invention to provide a thermoplastic resin composition having good metal adhesion properties and the like.

It is a further aspect of the present invention to provide a molded product formed of the thermoplastic resin composition.

The above and other aspects of the present invention can be achieved by the present invention described below.

Technical Solution

1. One aspect of the present invention relates to a thermoplastic resin composition. The thermoplastic resin composition includes: about 100 parts by weight of a thermoplastic resin including a polyester resin; about 50 parts by weight to about 150 parts by weight of glass fibers; and about 1 part by weight to about 10 parts by weight of a polyether-ester copolymer, wherein the polyether-ester copolymer has a melt volume flow rate (MVR) of about 30 $cm^3/10$ min to 120 $cm^3/10$ min, as measured under conditions of 230° C. and 2.16 kg in accordance with ISO 1133.

2. In Embodiment 1, the polyester resin may include at least one of polyethylene terephthalate, polybutylene terephthalate, polyethylene naphthalate, polytrimethylene terephthalate, and polycyclohexylenedimethylene terephthalate.

3. In Embodiment 1 or 2, the polyester resin may include about 20 wt % or less of polyethylene terephthalate and about 80 wt % or more of polybutylene terephthalate.

4. In Embodiments 1 to 3, the thermoplastic resin may include about 70 wt % or more of the polyester resin and about 30 wt % or less of a polycarbonate resin.

5. In Embodiments 1 to 4, the glass fibers may have a rectangular cross-section, an aspect ratio (long-side length/short-side length) of about 1.5 to about 10, and a short-side length of about 2 μm to about 10 μm.

6. In Embodiments 1 to 5, the polyether-ester copolymer may be a polymer of a reaction mixture including a $C_4$ to $C_{20}$ dicarboxylic acid, a $C_1$ to $C_{10}$ diol, and a poly(oxyalkylene) diol.

7. In Embodiments 1 to 6, the glass fibers and the polyether-ester copolymer may be present in a weight ratio of about 10:1 to about 50:1.

8. In Embodiments 1 to 7, the thermoplastic resin composition may have a dart drop height of about 65 to about 100 cm, at which cracks are generated on a 2.0 mm thick specimen when a 500 g dart is dropped thereon in a DuPont drop test.

9. In Embodiments 1 to 8, the thermoplastic resin composition may have a metal adhesion strength of about 35 MPa to about 55 MPa, as measured in accordance with ISO 19095.

10. Another aspect of the present invention relates to a molded product. The molded product may be formed of the thermoplastic resin composition according to any one of Embodiments 1 to 9.

Advantageous Effects

The present invention provides a thermoplastic resin composition having good impact resistance, appearance characteristics, and the like, and a molded product produced therefrom.

Best Mode

Hereinafter, embodiments of the present invention will be described in detail.

A thermoplastic resin composition according to the present invention includes: (A) a thermoplastic resin; (B) glass fibers; and (C) a polyether-ester copolymer.

As used herein to represent a specific numerical range, "a to b" is defined as "≥a and ≤b".

(A) Thermoplastic Resin

According to the present invention, the thermoplastic resin includes a polyester resin. For example, the polyester resin may be used alone or in the form of a blend with a polycarbonate resin.

(A1) Polyester Resin

The polyester resin according to the present invention may be selected from any polyester resins used in a typical thermoplastic resin composition. For example, the polyester resin may be obtained by polycondensation of a dicarboxylic acid component and a diol component, in which the dicarboxylic acid component may include: aromatic dicarboxylic acids, such as terephthalic acid (TPA), isophthalic acid (IPA), 1,2-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, 2,7-naphthalenedicarboxylic acid, and the like; and aromatic dicarboxylates, such as dimethyl terephthalate (DMT), dimethyl isophthalate, dimethyl-1,2-naphthalate, dimethyl-1,5-naphthalate, dimethyl-1,7-naphthalate, dimethyl-1,7-naphthalate, dimethyl-1,8-naphthalate, dimethyl-2,3-naphthalate, dimethyl-2,6-naphthalate, dimethyl-2,7-naphthalate, and the like, and in which the diol component may include ethylene glycol, 1,2-propylene glycol, 1,3-propylene glycol, 2,2-dimethyl-1,3-propane diol, 1,3-butane diol, 1,4-butane diol, 1,5-pentane diol, 1,5-pentane diol, 1,6-hexane diol, and cycloalkylene diol.

In some embodiments, the polyester resin may include at least one of polyethylene terephthalate (PET), polybutylene terephthalate (PBT), polyethylene naphthalate (PEN), polytrimethylene terephthalate (PTT), and polycyclohexylenedimethylene terephthalate (PCT).

In some embodiments, the polyester resin may be a polyester resin prepared by mixing about 10 wt % or less of polyethylene terephthalate with about 90 wt % or more of polybutylene terephthalate, for example, polybutylene terephthalate or a polyester resin prepared by mixing about 1 wt % to about 10 wt % of polyethylene terephthalate with about 90 wt % to about 99 wt % of polybutylene terephthalate. Within this range, the thermoplastic resin composition can exhibit good impact resistance, appearance characteristics, and the like.

In some embodiments, the polyester resin may have an intrinsic viscosity [η] of about 0.5 dl/g to about 1.5 dl/g, for example, about 0.7 dl/g to about 1.3 dl/g, as measured using o-chlorophenol as a solvent at 25° C. Within this range, the thermoplastic resin composition can exhibit good mechanical properties.

(A2) Polycarbonate Resin

The polycarbonate resin according to the embodiment serves to improve impact resistance, appearance characteristics and the like of the thermoplastic resin composition and may include a polycarbonate resin used in typical thermoplastic resin compositions. For example, the polycarbonate resin may be an aromatic polycarbonate resin prepared by reacting diphenols (aromatic diol compounds) with a precursor, such as phosgene, halogen formate, or carbonate diester.

In some embodiments, the diphenols may include, for example, 4,4'-biphenol, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis(3,5-dichloro-4-hydroxyphenyl)propane, 2,2-bis(3-methyl-4-hydroxyphenyl)propane, and 2,2-bis(3,5-dimethyl-4-hydroxyphenyl)propane, without being limited thereto. For example, the diphenols may be 2,2-bis(4-hydroxyphenyl)propane, 2,2-bis(3,5-dichloro-4-hydroxyphenyl)propane, 2,2-bis(3-methyl-4-hydroxyphenyl)propane, 2,2-bis(3,5-dimethyl-4-hydroxyphenyl)propane, or 1,1-bis(4-hydroxyphenyl)cyclohexane, specifically 2,2-bis(4-hydroxyphenyl)propane, which is also referred to as bisphenol-A.

In some embodiments, the polycarbonate resin may be a branched polycarbonate resin. For example, the polycarbonate resin may be a polycarbonate resin prepared by adding a tri- or higher polyfunctional compound, specifically, a tri- or higher valent phenol group-containing compound, in an amount of about 0.05 mol % to about 2 mol % based on the total number of moles of the diphenols used in polymerization.

In some embodiments, the polycarbonate resin may be a homopolycarbonate resin, a copolycarbonate resin, or a blend thereof. In addition, the polycarbonate resin may be partly or completely replaced by an aromatic polyester-carbonate resin obtained by polymerization in the presence of an ester precursor, for example, a bifunctional carboxylic acid.

In some embodiments, the polycarbonate resin may have a weight average molecular weight (Mw) of about 20,000 g/mol to about 50,000 g/mol, for example, about 25,000 g/mol to about 40,000 g/mol, as measured by gel permeation chromatography (GPC). Within this range, the thermoplastic resin composition can have good impact resistance and fluidity (processability).

In some embodiments, the thermoplastic resin (A) may include about 70 wt % or more, for example, about 80 wt % or more, of the polyester resin (A1) and about 30 wt % or less, for example, about 20 wt % or less of the polycarbonate resin (A2). Within this range, the thermoplastic resin composition can exhibit good properties in terms of impact resistance, metal adhesion properties, appearance characteristics, and the like.

(B) Glass Fibers

According to the present invention, the glass fibers serve to improve mechanical properties, such as stiffness and the like, of the thermoplastic resin composition, and may be selected from glass fibers used in a typical thermoplastic resin composition.

In some embodiments, the glass fibers may have a fibrous shape and may have various cross-sectional shapes, such as circular, elliptical, and rectangular shapes. For example, fibrous glass fibers having circular and/or rectangular cross-sectional shapes may be preferred in terms of mechanical properties.

In some embodiments, the glass fibers having a circular cross-section may have a cross-sectional diameter of about 5 μm to about 20 μm and a pre-processing length of about 2 nm to about 20 mm, and the glass fibers having a rectangular cross-section may have an aspect ratio (a ratio of a long-side length to a short-side length in a cross-section of the glass fiber) of about 1.5 to about 10, a short-side length of about 2 μm to about 10 μm, and a pre-processing length of about 2 mm to about 20 mm. Within this range, the thermoplastic resin composition can have good properties in terms of rigidity and processability.

In some embodiments, the glass fibers may be subjected to surface treatment with a typical surface treatment agent.

In some embodiments, the glass fibers may be present in an amount of about 50 to about 150 parts by weight, for example, about 60 to about 120 parts by weight, specifically about 70 to about 100 parts by weight, relative to about 100 parts by weight of the thermoplastic resin. If the content of the glass fibers is less than about 50 parts by weight relative to about 100 parts by weight of the thermoplastic resin, the thermoplastic resin composition can suffer from deterioration in stiffness, impact resistance, and the like, and if the content of the glass fibers exceeds about 150 parts by weight, the thermoplastic resin composition can suffer from deterioration in processability, appearance characteristics, metal adhesion properties, and the like.

(C) Polyether-Ester Copolymer

According to the present invention, the polyether-ester copolymer serves to improve impact resistance, appearance characteristics, metal adhesion properties, and the like of the thermoplastic resin composition and may be a polymer of a reaction mixture including a $C_4$ to $C_{20}$ dicarboxylic acid, a $C_1$ to $C_{10}$ diol, and a poly(oxyalkylene)diol.

In some embodiments, the polyether-ester copolymer may have a melt volume flow rate (MVR) of about 30 $cm^3$/10 min to 120 $cm^3$/10 min, for example, of about 30 $cm^3$/10 min to 105 $cm^3$/10 min, as measured under conditions of 230° C. and 2.16 kg in accordance with ISO 1133. If the content of the polyether-ester copolymer does not fall within this range, the thermoplastic resin composition can suffer from deterioration in impact resistance, appearance characteristics, metal adhesion properties, and the like.

In some embodiments, the polyether-ester copolymer may be present in an amount of about 1 to about 10 parts by weight, for example, about 1.5 to about 8 parts by weight, relative to about 100 parts by weight of the thermoplastic resin. If the content of the polyether-ester copolymer is less than about 1 part by weight relative to about 100 parts by weight of the thermoplastic resin, the thermoplastic resin composition can suffer from deterioration in impact resistance and the like, and if the content of the polyether-ester copolymer exceeds about 10 parts by weight, the thermoplastic resin composition can suffer from deterioration in impact resistance, appearance characteristics, metal adhesion properties, and the like.

In some embodiments, the glass fibers and the polyether-ester copolymer may be present in a weight ratio (B:C) of about 10:1 to about 50:1, for example, about 11:1 to about 47:1. Within this range, the thermoplastic resin composition can have good properties in terms of impact resistance, appearance characteristics and balance therebetween.

The thermoplastic resin composition according to one embodiment of the present invention may further include additives used in typical thermoplastic resin compositions. Examples of the additives may include flame retardants, antioxidants, anti-dripping agents, lubricants, release agents, nucleating agents, antistatic agents, stabilizers, pigments, dyes, and mixtures thereof, without being limited thereto. In the thermoplastic resin composition, the additives may be present in an amount of about 0.001 to about 40 parts by weight, for example, about 0.1 to about 10 parts by weight, relative to about 100 parts by weight of the thermoplastic resin.

The thermoplastic resin composition according to one embodiment of the present invention may be prepared in pellet form by mixing the aforementioned components, followed by melt extrusion in a typical twin-screw extruder at about 200° C. to about 280° C., for example, about 220° C. to about 250° C.

In some embodiments, the thermoplastic resin composition may have a dart drop height of about 65 cm to about 100 cm, for example, about 70 cm to about 90 cm, at which cracks are generated on a 2.0 mm thick specimen when a 500 g dart is dropped thereon in a DuPont drop test.

In some embodiments, the thermoplastic resin composition may have a notched Izod impact strength of about 10 kgf·cm/cm to about 15 kgf·cm/cm, for example, about 10 kgf·cm/cm to about 14 kgf·cm/cm, as measured on a ⅛" thick specimen in accordance with ASTM D256.

In some embodiments, the thermoplastic resin composition may have a metal adhesion strength of about 35 MPa to about 55 MPa, for example, about 35 MPa to about 50 MPa, as measured in accordance with ISO 19095.

A molded article according to the present invention is formed of the thermoplastic resin composition set forth above. The thermoplastic resin composition may be prepared in pellet form. The prepared pellets may be produced into various molded products (articles) by various molding methods, such as injection molding, extrusion, vacuum forming, casting, and the like. These molding methods are well known to those skilled in the art. The molded products have good impact resistance, chemical resistance, and balance therebetween, and are useful as housings of electric/electronic products.

Mode E for Invention

Next, the present invention will be described in more detail with reference to some examples. It should be understood that these examples are provided for illustration only and are not to be in any way construed as limiting the invention.

EXAMPLE

Details of components used in Examples and Comparative Examples are as follows.

(A) Thermoplastic Resin (A1) Polybutylene terephthalate (PBT, Manufacturer: China National BlueStar (Group) Co., Ltd.) having an intrinsic viscosity [η] of 1.3 dl/g as measured using o-chlorophenol as a solvent at 25° C. was used.

(A2) Polyethylene terephthalate (PET, Manufacturer: SK Chemicals Co., Ltd.) having an intrinsic viscosity [η] of 0.8 dl/g as measured using o-chlorophenol as a solvent at 25° C. was used.

(A3) A bisphenol-A polycarbonate resin (weight average molecular weight: 25,000 g/mol) was used.

(B) Glass Fibers (B1) Glass fibers (Manufacturer: Nitto Boseki Co., Ltd.) having a rectangular cross-section, a short-side length of 7 μm aspect ratio of 4, and a pre-processing length of 3 mm were used.

(B2) Glass fibers having a circular cross-section, a cross-sectional diameter of 10 and a pre-processing length of 3 mm were used.

(C) Polyether-Ester Copolymer (C1) A polyether-ester copolymer (Manufacturer: DSM, Product Name: Arnitel EE8100) having an MVR of 100 $cm^3$/10 min as measured under conditions of 230° C. and 2.16 kg in accordance with ISO 1133 was used.

(C2) A polyether-ester copolymer (Manufacturer: DSM, Product Name: Arnitel EM400) having an MVR of 33 $cm^3$/10 min as measured under conditions of 230° C. and 2.16 kg in accordance with ISO 1133 was used.

(C3) A polyether-ester copolymer (Manufacturer: DSM, Product Name: Arnitel EM550) having an MVR of 9 $cm^3$/10 min as measured under conditions of 230° C. and 2.16 kg in accordance with ISO 1133 was used.

(D) Impact Modifier

An ethylene/methyl acrylate copolymer (Manufacturer: DuPont, Product Name: Elvaloy AC1330) was used.

Examples 1 to 10 and Comparative Examples 1 to 8

The aforementioned components were mixed in amounts as listed in Tables 1 to 3, followed by extrusion at 260° C., thereby preparing a thermoplastic resin composition in pellet form. Here, extrusion was performed using a twin-screw extruder (L/D: 44, Φ: 45 mm) and the prepared pellets were dried at 80° C. for 4 hours or more and then subjected to injection molding using a 6 oz. injection machine (molding temperature: 230° C., mold temperature: 150° C.), thereby preparing a specimen. The prepared specimen was evaluated as to the following properties and results are shown in Tables 1 to 3.

Property Evaluation (1) Plate impact resistance (unit: cm): A dart drop height was measured on a 2.0 mm thick specimen using a 500 g dart in accordance with a DuPont drop test method.

(2) Notched Izod impact resistance (kgf·cm/cm): Notched Izod impact strength was measured on a ⅛" thick specimen in accordance with ASTM D256.

(3) Metal adhesion strength (unit: MPa): Adhesion strength was measured in accordance with ISO 19095 after a thermoplastic resin composition specimen was bonded to an aluminum specimen. Here, the aluminum specimen was subjected to TRI surface treatment of Geo Nation Co., Ltd. to allow easy adhering to the thermoplastic resin composition specimen. The aluminum specimen and the thermoplastic resin composition specimen had a size of 1.2 cm×4 cm×0.3 cm and were bonded to each other over a cross-sectional area of 1.2 cm×0.3 cm for measurement of adhesion strength.

(4) Appearance evaluation: Generation of a white mark was observed on each of the injection-molded specimens prepared in Examples and Comparative Examples through the naked eye.

TABLE 1

|  |  | Example | | | | |
|---|---|---|---|---|---|---|
|  |  | 1 | 2 | 3 | 4 | 5 |
| (A) | (A1) | 100 | 85 | 80 | 68 | 100 |
| (wt %) | (A2) | — | 15 | — | 12 | — |
|  | (A3) | — | — | 20 | 20 | — |
| (B1) (parts by weight) | | 82 | 82 | 82 | 82 | 82 |
| (B2) (parts by weight) | | — | — | — | — | — |
| (C1) (parts by weight) | | 1.8 | 1.8 | 1.8 | 1.8 | 7.3 |
| (C2) (parts by weight) | | — | — | — | — | — |
| (C3) (parts by weight) | | — | — | — | — | — |
| (D) (parts by weight) | | — | — | — | — | — |
| Plate impact strength (cm) | | 71 | 72 | 75 | 73 | 81 |
| Notched Izod impact strength (kgf·cm/cm) | | 10 | 11 | 11 | 11 | 12 |
| Metal adhesion strength (MPa) | | 38 | 35 | 36 | 34 | 37 |
| Generation of white mark | | x | x | x | x | x |

* parts by weight: parts by weight relative to 100 parts by weight of the thermoplastic resin (A)

TABLE 2

|  |  | Example | | | | |
|---|---|---|---|---|---|---|
|  |  | 6 | 7 | 8 | 9 | 10 |
| (A) | (A1) | 85 | 80 | 68 | 100 | 80 |
| (wt %) | (A2) | 15 | — | 12 | — | — |
|  | (A3) | — | 20 | 20 | — | 20 |
| (B1) (parts by weight) | | 82 | 82 | 82 | — | 82 |
| (B2) (parts by weight) | | — | — | — | 82 | — |
| (C1) (parts by weight) | | 7.3 | 7.3 | 7.3 | 1.8 | — |
| (C2) (parts by weight) | | — | — | — | — | 1.8 |
| (C3) (parts by weight) | | — | — | — | — | — |
| (D) (parts by weight) | | — | — | — | — | — |
| Plate impact strength (cm) | | 84 | 83 | 82 | 75 | 70 |
| Notched Izod impact strength (kgf·cm/cm) | | 13 | 13 | 12 | 11 | 10 |
| Metal adhesion strength (MPa) | | 35 | 36 | 35 | 39 | 35 |
| Generation of white mark | | x | x | x | x | x |

* parts by weight: parts by weight relative to 100 parts by weight of the thermoplastic resin (A)

TABLE 3

|  |  | Comparative Example | | | | | | | |
|---|---|---|---|---|---|---|---|---|---|
|  |  | 1 | 2 | 3 | 4 | 5 | 6 | 7 | 8 |
| (A) (wt %) | (A1) | 100 | 100 | 100 | 100 | 100 | 80 | 100 | 80 |
|  | (A2) | — | — | — | — | — | 20 | — | 20 |
|  | (A3) | — | — | — | — | — | — | — | — |
| (B1) (parts by weight) | | 45 | 155 | 82 | 82 | 82 | 82 | 82 | 82 |
| (C1) (parts by weight) | | 1.8 | 1.8 | 0.5 | 11 | — | — | — | — |
| (C2) (parts by weight) | | — | — | — | — | — | — | — | — |
| (C3) (parts by weight) | | — | — | — | — | 1.8 | 1.8 | — | — |
| (D) (parts by weight) | | — | — | — | — | — | — | 1.8 | 1.8 |
| Plate impact strength (cm) | | 50 | 48 | 60 | 85 | 56 | 55 | 64 | 68 |
| Notched Izod impact strength (kgf · cm/cm) | | 7 | 9 | 9 | 14 | 9 | 9 | 12 | 22 |
| Metal adhesion strength (MPa) | | 32 | 25 | 38 | 22 | 32 | 30 | 32 | 33 |
| Generation of white mark | | x | x | x | x | x | x | ○ | ○ |

* parts by weight: parts by weight relative to 100 parts by weight of the thermoplastic resin (A)

From the above result, it could be seen that the thermoplastic resin compositions according to the present invention had good properties in terms of impact resistance, appearance characteristics, metal adhesion properties, and the like.

Conversely, it could be seen that the thermoplastic resin composition of Comparative Example 1 prepared using a small amount of glass fibers suffered from deterioration in impact strength, metal adhesion properties, and the like; the thermoplastic resin composition of Comparative Example 2 prepared using an excess of glass fibers suffered from deterioration in plate impact strength, metal adhesion properties, and the like; the thermoplastic resin composition of Comparative Example 3 prepared using a small amount of a polyether-ester copolymer suffered from deterioration in impact strength and the like; and the thermoplastic resin composition of Comparative Example 2 prepared using an excess of a polyether-ester copolymer suffered from deterioration in metal adhesion properties and the like. Further, the thermoplastic resin compositions of Comparative Examples 5 to 8 prepared using the polyether-ester copolymer (C3) or the ethylene/methyl acrylate copolymer instead of the polyether-ester copolymer (C1) suffered from deterioration in plate impact strength, metal adhesion properties, appearance characteristics, and the like.

It should be understood that various modifications, changes, alterations, and equivalent embodiments can be made by those skilled in the art without departing from the spirit and scope of the present invention.

The invention claimed is:

1. A thermoplastic resin composition comprising:
   about 100 parts by weight of a thermoplastic resin comprising a polyester resin;
   about 50 parts by weight to about 150 parts by weight of glass fibers; and
   about 1 part by weight to about 10 parts by weight of a polyether-ester copolymer,
   wherein the polyether-ester copolymer has a melt volume flow rate (MVR) of about 30 cm$^3$/10 min to 120 cm$^3$/10 min, as measured under conditions of 230° C. and 2.16 kg in accordance with ISO 1133,
   wherein the thermoplastic resin composition has a dart drop height of about 65 to about 100 cm, at which cracks are generated on a 2.0 mm thick specimen when a 500 g dart is dropped thereon in a DuPont drop test, and
   wherein the thermoplastic resin composition has a metal adhesion strength of about 35 MPa to about 55 MPa, as measured in accordance with ISO 19095.

2. The thermoplastic resin composition according to claim 1, wherein the polyester resin comprises polyethylene terephthalate, polybutylene terephthalate, polyethylene naphthalate, polytrimethylene terephthalate, and/or polycyclohexylenedimethylene terephthalate.

3. The thermoplastic resin composition according to claim 1, wherein the polyester resin comprises about 20 wt % or less of polyethylene terephthalate and about 80 wt % or more of polybutylene terephthalate.

4. The thermoplastic resin composition according to claim 1, wherein the thermoplastic resin comprises about 70 wt % or more of the polyester resin and about 30 wt % or less of a polycarbonate resin.

5. The thermoplastic resin composition according to claim 1, wherein the glass fibers have a rectangular cross-section, an aspect ratio (long-side length/short-side length) of about 1.5 to about 10, and a short-side length of about 2 μm to about 10 μm.

6. The thermoplastic resin composition according to claim 1, wherein the polyether-ester copolymer is a polymer of a reaction mixture comprising a $C_4$ to $C_{20}$ dicarboxylic acid, a $C_1$ to $C_{10}$ diol, and a poly(oxyalkylene)diol.

7. The thermoplastic resin composition according to claim 1, wherein the glass fibers and the polyether-ester copolymer are present in a weight ratio of about 10:1 to about 50:1.

8. A molded product formed of the thermoplastic resin composition according to claim 1.

9. The thermoplastic resin composition according to claim 1, wherein the thermoplastic resin composition has a dart drop height of about 70 to about 90 cm, at which cracks are generated on a 2.0 mm thick specimen when a 500 g dart is dropped thereon in a DuPont drop test.

10. A thermoplastic resin composition comprising:
    about 100 parts by weight of a thermoplastic resin comprising a polyester resin;
    about 50 parts by weight to about 150 parts by weight of glass fibers; and
    about 1 part by weight to about 10 parts by weight of a polyether-ester copolymer having a melt volume flow rate (MVR) of about 30 cm$^3$/10 min to 120 cm$^3$/10 min, as measured under conditions of 230° C. and 2.16 kg in accordance with ISO 1133,
    wherein the thermoplastic resin composition has a dart drop height of about 70 to about 90 cm, at which cracks are generated on a 2.0 mm thick specimen when a 500 g dart is dropped thereon in a DuPont drop test.

* * * * *